United States Patent
Yamamoto et al.

(10) Patent No.: US 9,853,578 B2
(45) Date of Patent: Dec. 26, 2017

(54) ULTRASONIC GENERATOR

(71) Applicant: MURATA MANUFACTURING CO., LTD., Nagaokakyo-shi, Kyoto-Fu (JP)

(72) Inventors: Hironari Yamamoto, Nagaokakyo (JP); Akihiro Mitani, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 820 days.

(21) Appl. No.: 14/445,593

(22) Filed: Jul. 29, 2014

(65) Prior Publication Data

US 2014/0333182 A1 Nov. 13, 2014

Related U.S. Application Data

(63) Continuation of application No. PCT/JP2013/053407, filed on Feb. 13, 2013.

(30) Foreign Application Priority Data

Feb. 23, 2012 (JP) .................. 2012-037503

(51) Int. Cl.
*H01L 41/09* (2006.01)
*B06B 1/06* (2006.01)
(Continued)

(52) U.S. Cl.
CPC .................. *H02N 2/18* (2013.01); *B06B 1/06* (2013.01); *B06B 1/0603* (2013.01); *G10K 9/125* (2013.01); *G10K 9/22* (2013.01)

(58) Field of Classification Search
CPC .......... H02N 2/18; B06B 1/06; B06B 1/0603; G10K 9/125; G10K 9/22
(Continued)

(56) References Cited

U.S. PATENT DOCUMENTS 3,194,209 A * 7/1965 Nelkin .................. B06B 1/04
    116/137 A
4,979,219 A  12/1990 Lin
(Continued)

FOREIGN PATENT DOCUMENTS

CN  1304275 A  7/2001
JP  05-219588 A  8/1993
(Continued)

OTHER PUBLICATIONS

Written Opinion and International Search Report issued on PCT/JP2013/053407 dated Mar. 12, 2013.

*Primary Examiner* — Thomas Dougherty
(74) *Attorney, Agent, or Firm* — Arent Fox LLP

(57) ABSTRACT

An ultrasonic generator that is capable of increasing output sound pressure is provided.

An ultrasonic generating element is accommodated in an accommodation space that is formed by a first case member and a second case member. The ultrasonic generating element is secured to the first case member via a plurality of first supporting members. The first supporting members are provided so that, in a first acoustic path that includes a space formed between a bottom surface of the ultrasonic generating element and a top surface of the first case member and that extends to sound-wave emission holes, a transverse section of the acoustic path has a portion that becomes smaller than another portion thereof.

20 Claims, 6 Drawing Sheets

(51) Int. Cl.
*H04R 1/02* (2006.01)
*H02N 2/18* (2006.01)
*G10K 9/125* (2006.01)
*G10K 9/22* (2006.01)

(58) Field of Classification Search
USPC .................................................. 310/322, 334
See application file for complete search history.

(56) References Cited

U.S. PATENT DOCUMENTS

| | | |
|---|---|---|
| 8,400,363 B2 | 3/2013 | Nam et al. |
| 9,135,906 B2 * | 9/2015 | Mitani .................. G10K 9/122 |
| 9,636,709 B2 * | 5/2017 | Yamamoto ............ B06B 1/0603 |
| 2001/0004180 A1 | 6/2001 | Kishimoto |
| 2003/0021458 A1 | 1/2003 | Hamada |
| 2011/0038495 A1 | 2/2011 | Joeong |

FOREIGN PATENT DOCUMENTS

| | | | |
|---|---|---|---|
| JP | 05-344582 A | 12/1993 | |
| JP | 2004-297219 A | 10/2004 | |
| JP | 2004-312395 A | 11/2004 | |
| JP | 2004-312561 A | 11/2004 | |
| JP | 2010-141397 A | 6/2010 | |
| JP | 2010-187361 A | 8/2010 | |
| JP | WO-2015011956 A1 * | 2/2015 | ............. H04R 17/00 |

\* cited by examiner

PRIOR ART

ULTRASONIC GENERATOR

CROSS-REFERENCE TO RELATED APPLICATIONS

The present application is a continuation of PCT/JP2013/053407 filed Feb. 13, 2013, which claims priority to Japanese Patent Application No. 2012-037503, filed Feb. 23, 2012, the entire contents of each of which are incorporated herein by reference.

FIELD OF THE INVENTION

The present invention relates to an ultrasonic generator including an ultrasonic generating element using a piezoelectric vibrator. More specifically, the present invention relates to an ultrasonic generator in which an ultrasonic generating element is accommodated in a case and an acoustic path extending from the ultrasonic generating element to a sound-wave emission hole, provided in the case, is formed.

BACKGROUND OF THE INVENTION

Nowadays, as an accurate distance measurement method, a distance measurement method using ultrasonic waves is being used. In this method, ultrasonic waves are emitted from an ultrasonic generator and are caused to strike a measurement object. Ultrasonic waves reflected from the measurement object are detected by an ultrasonic microphone device. This method is a method for calculating the distance to the measurement object from the time taken from the emission to the detection.

For example, Patent Document 1 discloses an ultrasonic generator in which piezoelectric vibrators are mounted on a housing. The ultrasonic generator in Patent Document 1 is formed as an ultrasonic sensor device in which a single device serves as both an ultrasonic generator and an ultrasonic microphone device.

FIG. 9 shows an ultrasonic generator 500 disclosed in Patent Document 1. The ultrasonic generator 500 includes a case 101. A first piezoelectric vibrator 102 and a second piezoelectric vibrator 103 that vibrates in an opposite phase to that of the first piezoelectric vibrator 102 are disposed in the case 101. A space in the case 101 is filled with a flexible filler 105.

Patent Document 1: Japanese Unexamined Patent Application Publication No. 2004-297219

In the above-described distance measurement method, in order to make measurement results more accurate and to lengthen the measurable distance, it is necessary to increase output sound pressure of the ultrasonic generator.

However, in the existing ultrasonic generator 500, there is a limit to how high the output sound pressure can be made. In order to increase the output sound pressure, it is necessary to increase polarization of a piezoelectric vibrator and to increase electric power that is supplied to the piezoelectric vibrator. However, there is a limit to the extent of polarization of the piezoelectric vibrator. If the electric power supply is too large, the piezoelectric vibrator may exceed the fracture limitation. Consequently, there is a limit to how high the output sound pressure can be made.

SUMMARY OF THE INVENTION

An object of the present invention is to provide an ultrasonic generator that is capable of further increasing output sound pressure.

An ultrasonic generator according to the present invention includes a first case member, a second case member that is secured to the first case member, and an ultrasonic generating element that is accommodated in an accommodation space that is formed by the first case member and the second case member. The ultrasonic generator according to the present invention further includes a first supporting member that is provided at the first case member and that supports the ultrasonic generating element so that a space is formed between a bottom surface of the ultrasonic generating element and a top surface of the first case member. In the present invention, a sound-wave emission hole from which an ultrasonic wave is emitted is provided in one of the first case member and the second case member. A sound wave generated by the ultrasonic generating element moves to the sound-wave emission hole via the space formed between the bottom surface of the ultrasonic generating element and the top surface of the first case member. In the present invention, the first supporting member is provided so that, in a first acoustic path that includes the space formed between the bottom surface of the ultrasonic generating element and the top surface of the first case member and that extends to the sound-wave emission hole from a sound pressure generation center point of the ultrasonic generating element, a transverse section of the acoustic path has a portion that becomes smaller than another portion thereof.

In a particular aspect of the ultrasonic generator according to the present invention, the ultrasonic generating element includes a spacer where one of a recessed portion and a through hole is formed in a center thereof, a first piezoelectric vibrator that is disposed at one of principal surfaces of the spacer and that is plate-shaped, and a second piezoelectric vibrator that is disposed at the other of the principal surfaces of the spacer and that is plate-shaped. The first piezoelectric vibrator and the second piezoelectric vibrator vibrate in opposite phases.

In another particular aspect of the ultrasonic generator according to the present invention, the ultrasonic generator further includes a second supporting member that is provided between the ultrasonic generating element and the second case member and that supports the ultrasonic generating element so that a space is formed between a top surface of the ultrasonic generating element and a bottom surface of the second case member. The second supporting member is provided so that, in a second acoustic path that includes the space formed between the top surface of the ultrasonic generating element and the bottom surface of the second case member and that extends to the sound-wave emission hole from the sound pressure generation center point of the ultrasonic generating element, a transverse section of the acoustic path has a portion that becomes smaller than another portion thereof. In this case, it is possible to effectively increase sound pressure in both the first and second acoustic paths.

In still another particular aspect of the ultrasonic generator according to the present invention, at least one of the first supporting member and the second supporting member is plural in number. A portion between the supporting members that are adjacent to each other forms part of the first acoustic path or the second acoustic path. The portion of the transverse section of the acoustic path that becomes smaller than the another portion thereof is provided at the portion between the supporting members that are adjacent to each other.

In still another particular aspect of the ultrasonic generator according to the present invention, in plan view, the supporting members that are adjacent to each other have a shape in which a distance between the supporting members that are adjacent to each other becomes smaller from the sound pressure generation center point of the ultrasonic generating element towards the portion between the supporting members that are adjacent to each other.

In still another particular aspect of the ultrasonic generator according to the present invention, opposing sides of the supporting members that are adjacent to each other extend in a direction that crosses an oblique direction with respect to the acoustic path that extends between the supporting members that are adjacent to each other. With respect to the acoustic path between the supporting members that are adjacent to each other, the side of one of the supporting members that are adjacent to each other is disposed in line symmetry with the side of the other of the supporting members that are adjacent to each other.

In still another particular aspect of the ultrasonic generator according to the present invention, each supporting member is substantially triangular in plan view, and the opposing sides of the supporting members that are adjacent to each other are each formed by one side of the corresponding substantially triangular shape.

In the ultrasonic generator according to the present invention, the first supporting member is provided so that, in the first acoustic path that includes the space formed between the bottom surface of the ultrasonic generating element and the top surface of the first case member and that extends to the sound-wave emission hole from the sound pressure generation center point of the ultrasonic generating element, the transverse section of the acoustic path has a portion that becomes smaller than another portion thereof. Therefore, it is possible to effectively increase output sound pressure.

DESCRIPTION OF EMBODIMENTS

Specific embodiments of the present invention are hereunder described with reference to the drawings, so that the present invention is made explicit.

Figure 1:
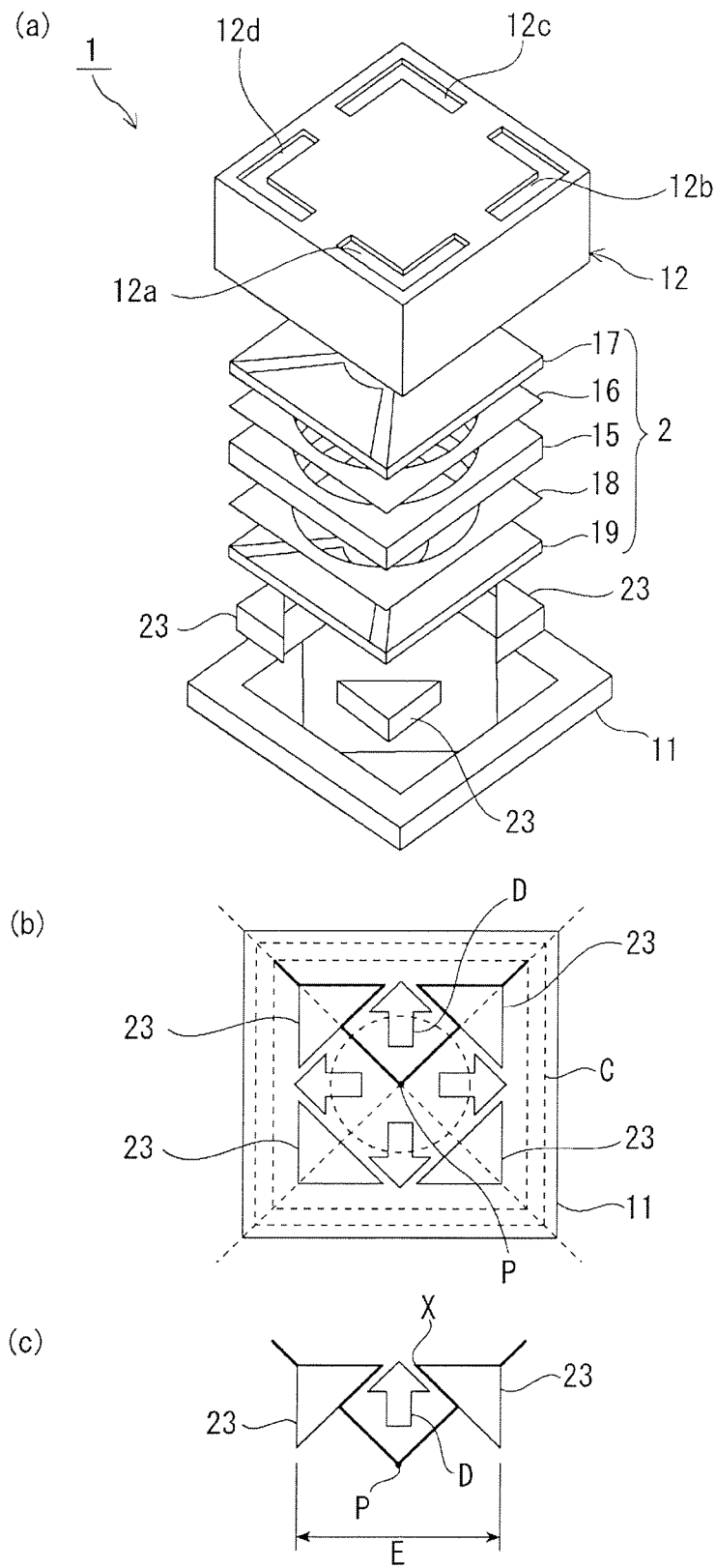
FIG. 1(a) is an exploded perspective view of an ultrasonic generator according to a first embodiment of the present invention.
FIG. 1(b) is a schematic plan view for describing a structure in which a plurality of first supporting members are provided on a first case member, and a first acoustic path.
FIG. 1(c) is a schematic view of, in a first acoustic path, a portion of a transverse section of the acoustic path that becomes relatively smaller.
Figure 2:
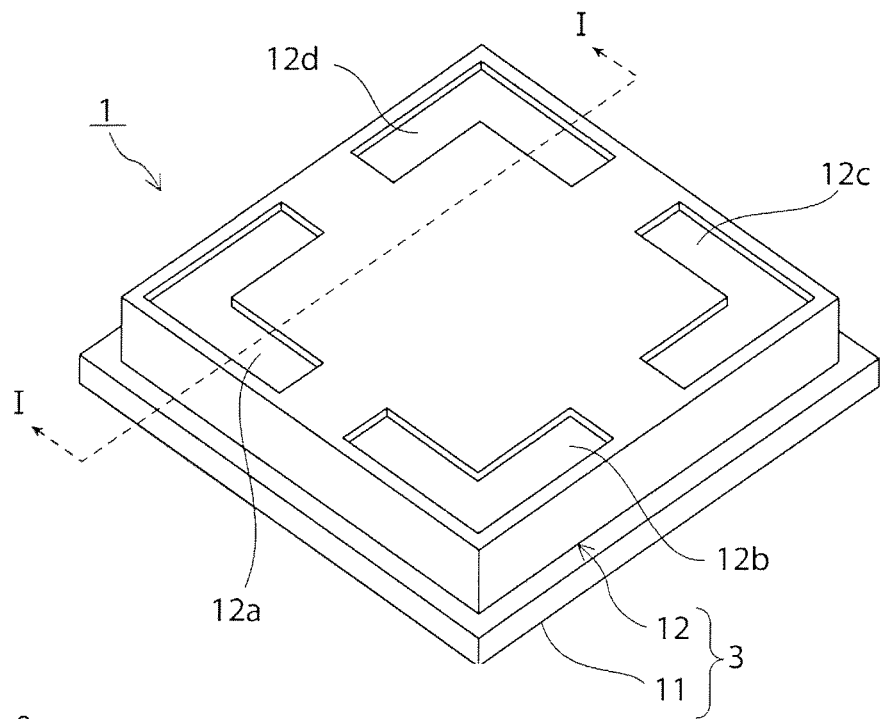
FIG. 2 is an external perspective view of the ultrasonic generator according to the first embodiment of the present invention.
Figure 3:
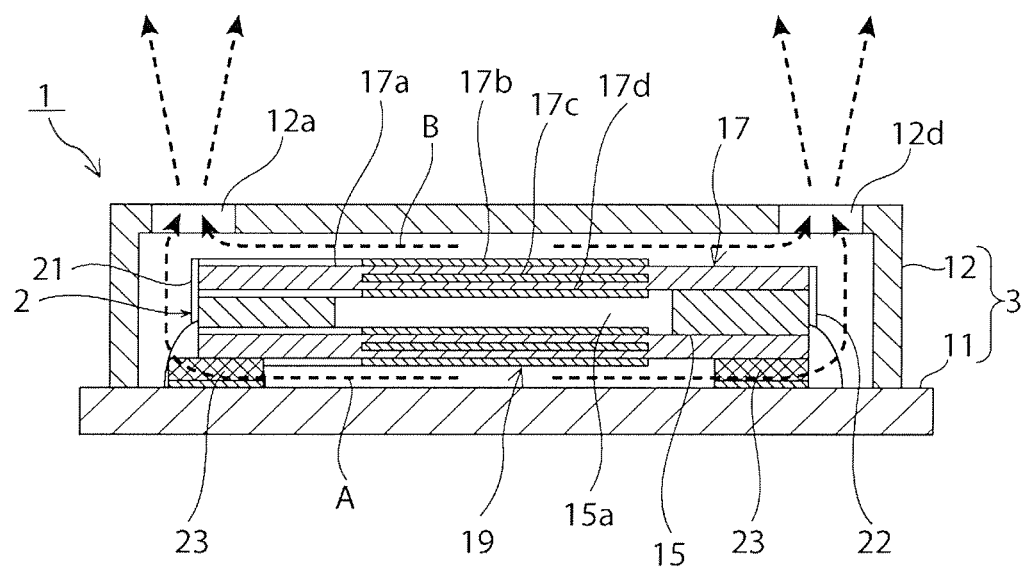
FIG. 3 is a front sectional view of the ultrasonic generator according to the first embodiment of the present invention.

FIG. 1(a) is an exploded perspective view of an ultrasonic generator 1 according to a first embodiment of the present invention. FIG. 2 is an external perspective view thereof. FIG. 3 is a front sectional view thereof.

The ultrasonic generator 1 includes an ultrasonic generating element 2 that generates ultrasonic waves, and a case 3. The ultrasonic generating element 2 is accommodated in the case 3.

The case 3 includes a plate-shaped first case member 11 and a cap-shaped second case member 12. That is, the second case member 12 having an open lower side is secured to the plate-shaped first case member 11. As a result, the case 3 having an internal accommodation space is formed. The ultrasonic generating element 2 is accommodated in the accommodation space.

As shown in the perspective view of FIG. 2, a plurality of sound-wave emission holes 12a to 12d are provided in a top plate of the second case member 12.

Figure 4:
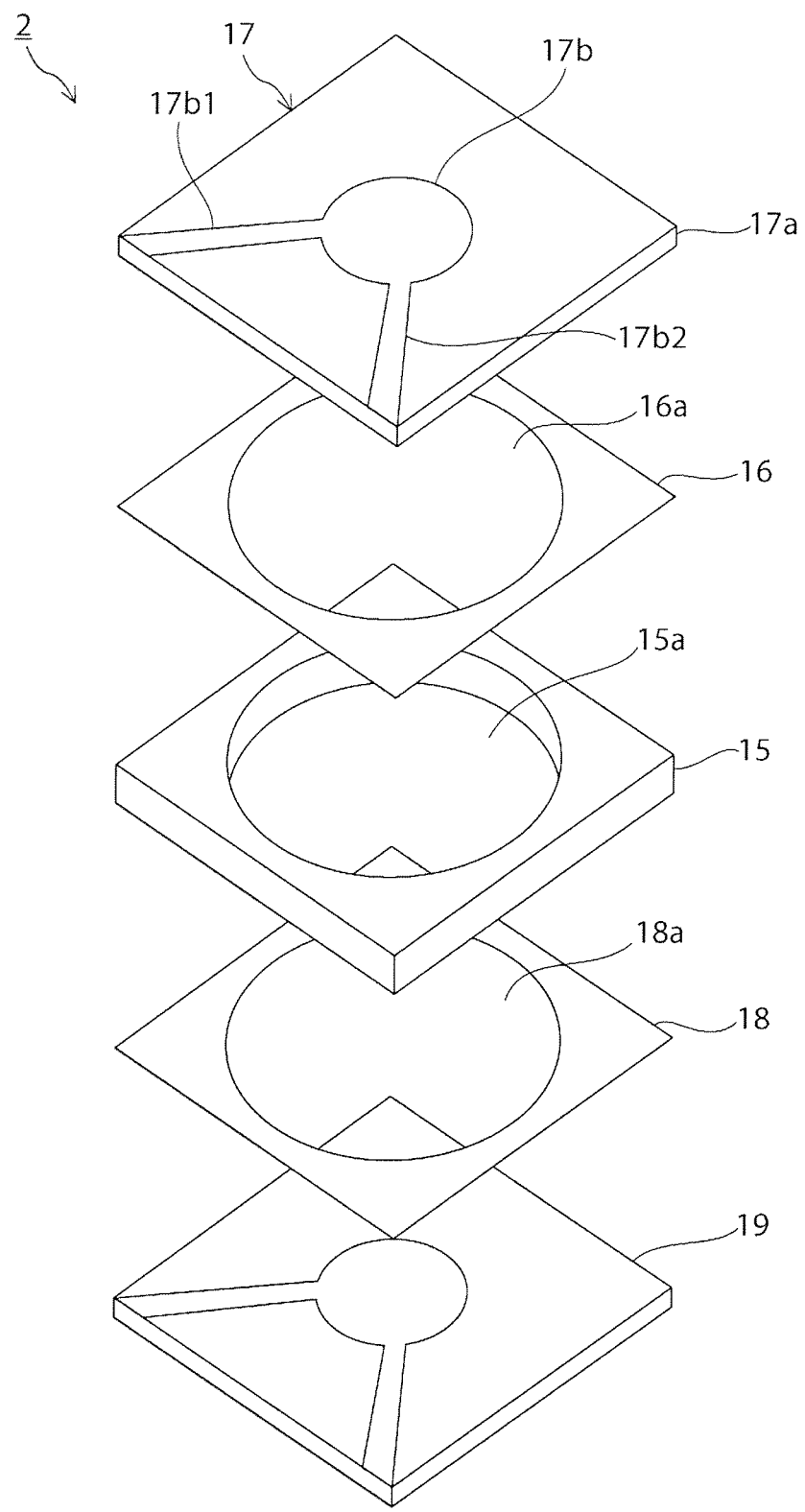
FIG. 4 is an exploded perspective view of an ultrasonic generating element that is used in the ultrasonic generator according to the first embodiment of the present invention.

FIG. 4 is an exploded perspective view of the ultrasonic generating element 2. The ultrasonic generating element 2 includes a spacer 15. The spacer 15 is formed of, for example, an appropriate rigid material, such as resin or ceramics. An opening 15a, which is a through hole, is formed in a central region of the spacer 15. Instead of the opening 15a, which is a through hole, recessed portions may be formed in the front and back surfaces of the central region of the spacer 15.

A first bimorph piezoelectric element 17 is disposed on a top surface of the spacer 15 via an adhesive 16. The adhesive 16 has an opening 16a. The adhesive 16 is applied to a region of the top surface of the spacer 15 excluding the opening 15a of the spacer 15.

Similarly, a second bimorph piezoelectric vibrator 19 is disposed on a bottom surface of the spacer 15 via an adhesive 18. The adhesive 18 has an opening 18a. The adhesive 18 is applied to a region of the bottom surface of the spacer 15 excluding the opening 15a of the spacer 15. In FIG. 3, the adhesives 16 and 18 are not shown.

A central region of the first bimorph piezoelectric vibrator 17 and a central region of the second bimorph piezoelectric vibrator 19 are portions that vibrate due to a piezoelectric effect. Therefore, in order not to prevent the vibration, the opening 15a is formed in the central region of the spacer 15.

As shown in FIG. 3, the first bimorph piezoelectric vibrator 17 includes a piezoelectric plate 17a formed of piezoelectric ceramics such as lead zirconate titanate (PZT). A first excitation electrode 17b is provided at the center of a top surface of the piezoelectric plate 17a. The piezoelectric plate 17a has a plurality of piezoelectric layers. An internal excitation electrode 17c is placed so as to overlap the first excitation electrode 17b via the corresponding piezoelectric layer. Further, a second excitation electrode 17d is provided at the center of a bottom surface of the piezoelectric plate 17a so as to overlap the internal excitation electrode 17c via the corresponding piezoelectric layer. As shown in FIG. 4, the first excitation electrode 17b is connected to extraction electrodes 17b1 and 17b2 each extending towards two corners that are adjacent to each other.

The piezoelectric layer between the first excitation electrode 17b and the internal excitation electrode 17c and the piezoelectric layer between the internal excitation electrode 17c and the second excitation electrode 17d are polarized in the same direction in a thickness direction. In order to operate as a bimorph piezoelectric vibrator, the first excitation electrode 17b and the second excitation electrode 17d are electrically connected to a first terminal electrode 21 shown in FIG. 3. The terminal electrode 21 is provided at one of the end surfaces of the ultrasonic generating element 2. A terminal electrode 22 is provided at the other end surface of the ultrasonic generating element 2. The internal excitation electrode 17c is electrically connected to the second terminal electrode 22. Therefore, by applying an alternating-current electric field to a location between the first terminal electrode 21 and the second terminal electrode 22, the first bimorph piezoelectric vibrator 17 vibrates.

The second bimorph piezoelectric vibrator 19 has the same structure as the first bimorph piezoelectric vibrator 17. However, the second bimorph piezoelectric vibrator 19 is formed so as to vibrate in an opposite phase to that of the first bimorph piezoelectric vibrator 17. The second bimorph piezoelectric vibrator 19 is also electrically connected to the first terminal electrode 21 and the second terminal electrode 22. Therefore, by applying an alternating-current electric field to a location between the first terminal electrode 21 and the second terminal electrode 22, the second bimorph piezoelectric vibrator 19 vibrates.

Consequently, by applying alternating-current electric fields to a location between the first terminal electrode 21 and the second terminal electrode 22, the ultrasonic generating element 2 operates as a buckling tuning fork type vibrator and generates ultrasonic waves. In this case, the ultrasonic waves move from a bottom surface of the ultrasonic generating element 2 to a space between the bottom surface of the ultrasonic generating element 2 and a top surface of the first case member 11, move to a space between a side surface of the ultrasonic generating element 2 and a side surface of the second case member 12, and reach the aforementioned sound-wave emission holes 12a to 12d. Similarly, ultrasonic waves move from a top surface of the ultrasonic generating element 2 to a space between the top surface of the ultrasonic generating element 2 and a bottom surface of the second case member 12, and reach the sound-wave emission holes 12a to 12d. This allows the ultrasonic waves to be emitted from the sound-wave emission holes 12a to 12d.

An ultrasonic-wave propagation path including the space between the bottom surface of the ultrasonic generating element 2 and the top surface of the first case member 11 is defined as a first acoustic path A. An ultrasonic-wave propagation path including the space between the top surface of the ultrasonic generating element 2 and the bottom surface of the second case member 12 is defined as a second acoustic path B. In the ultrasonic generator 1, the ultrasonic waves that are generated by the ultrasonic generating element 2 propagate through the first acoustic path A and the second acoustic path B indicated by broken lines in FIG. 3 and reach the sound-wave emission holes 12a to 12d. The ultrasonic waves are emitted from the sound-wave emission holes 12a to 12d.

In the embodiment, the ultrasonic generating element 2 is secured to the first case member 11 via a plurality of first supporting members 23. The first supporting members 23 support the ultrasonic generating element 2 so that the space is formed between the bottom surface of the ultrasonic generating element 2 and the top surface of the first case member 11. The plurality of first supporting members 23 are formed of appropriate rigid materials. Examples of such rigid materials are ceramics, metal, and resin.

More specifically, the plurality of first supporting members 23 are provided on the first case member 11. The ultrasonic generating element 2 is bonded to the plurality of supporting members 23 with an adhesive (not shown). The thickness of each first supporting member 23 allows the space that forms the aforementioned first acoustic path A to be formed.

A characteristic of the embodiment is that the first supporting members 23 are provided so that, in the first acoustic path A, a transverse section of the acoustic path has portions that become relatively smaller than other portions thereof. This is described in more detail with reference to FIGS. 1(b) and 1(c). FIG. 1(b) is a schematic plan view of a structure in which the plurality of first supporting members 23 are provided on the first case member 11. FIG. 1(c) is a schematic view of, in the first acoustic path A, a portion of the transverse section of the acoustic path that becomes relatively smaller. In FIG. 1, broken lines C indicate portions of the second case member 12 that are bonded.

In FIG. 1(c), a direction of the first acoustic path A is indicated by arrow D. That is, the center at a lower side of the ultrasonic generating element 2 that is positioned above the first case member 11 is an ultrasonic generation center point P. From the ultrasonic generation center point P, ultrasonic waves propagate through the first acoustic path A as indicated by arrow D.

In the embodiment, the shape of each first supporting member 23 is a right-angled triangle in plan view. In addition, in the first acoustic path A, the distances between adjacent first supporting members 23 and 23 become smaller from the ultrasonic generation center point P towards where the first supporting members 23 and 23 are adjacent to each other. More specifically, the hypotenuses of the right-angled triangles of the adjacent first supporting members 23 and 23 oppose each other via the first acoustic path A whose direction is indicated by arrow D. Further, the hypotenuses extend toward the side of the first acoustic path A as the first acoustic path A extends away from the ultrasonic generation center point P. Therefore, the distances between the adjacent first supporting members 23 and 23 become smaller towards the front in a travel direction in the first acoustic path A from the ultrasonic generation center point P.

Beyond the opposing portions of the adjacent first supporting members 23 and 23, the first acoustic path A widens. That is, as shown in the schematic plan view of FIG. 1(c), in the first acoustic path A, a portion X of the transverse section of the acoustic path that is relatively smaller than other portions thereof is provided. This makes it possible to effectively increase the output sound pressure.

As shown in FIG. 1(b), there are four locations where the first supporting members 23 and 23 are adjacent to each other. Therefore, output sound pressure is increased at four portions of the first acoustic path A. The number of adjacent first supporting members 23 and 23 is not particularly limited.

Figure 5:
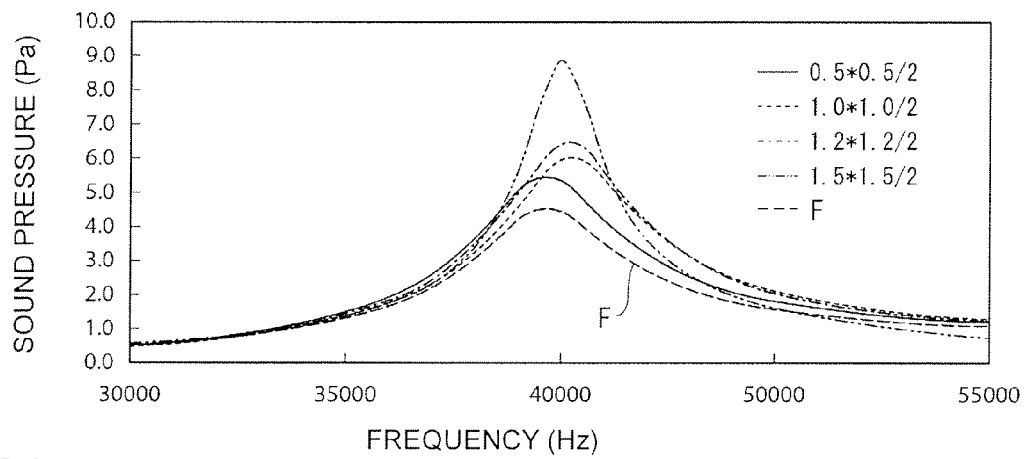
FIG. 5 is a graph showing the relationship between output sound pressure characteristics and the size of the first supporting members in the ultrasonic generator according to the first embodiment of the present invention.

In the ultrasonic generator 1 according to the embodiment, the size of the first supporting members 23 was changed and output sound pressure characteristics were measured. The results are shown in FIG. 5. FIG. 5 is a graph showing the relationship between the output sound pressure characteristics and the size of the first supporting members 23 in the ultrasonic generator 1 according to the embodiment. In the ultrasonic generator 1, a distance E in FIG. 1(c) is 3.3 mm. That is, the distance between outer ends of the adjacent first supporting members 23 and 23 was set to the distance E, and this distance E was supported. In each first supporting member 23, the lengths of two sides of the right-angled triangle orthogonal to each other were changed so as to be set at 0.5 mm, 1.0 mm, 1.2 mm, and 1.5 mm. Therefore, the size of the narrowest portion between the adjacent first supporting members 23 and 23 was set at 2.3 mm, 1.3 mm, 0.9 mm, and 0.3 mm.

In FIG. 5, a solid line represents the result when the lengths of the two sides of the right-angled triangle that are orthogonal to each other are 0.5 mm, a dotted line represents the result when the lengths thereof are 1.0 mm, an alternate long and short dashed line represents the result when the lengths thereof are 1.2 mm, and an alternate long and two short dashed line represents the result when the lengths thereof are 1.5 mm. The thickness of each first supporting member 23 is 0.10 mm.

FIG. 5 shows that, as the size of the narrowest portion between the adjacent first supporting members 23 and 23 becomes smaller, the output sound pressure becomes higher. In FIG. 5, output sound pressure characteristics of a comparative example using different supporting members in place of the first supporting members 23 are represented by a broken line F. The different supporting members are such that, in the first acoustic path A, a transverse section of the acoustic path does not have a portion that becomes relatively smaller than other portions thereof. It can be understood that, compared to the comparative example indicated by the broken line F, the embodiment allows the output sound pressure to be effectively increased because the first supporting members 23 and 23 having a right-angled triangular shape in plan view oppose each other and the portion X where the transverse section of the acoustic path becomes relatively smaller than other portions thereof is provided in the first acoustic path A.

Figure 6:
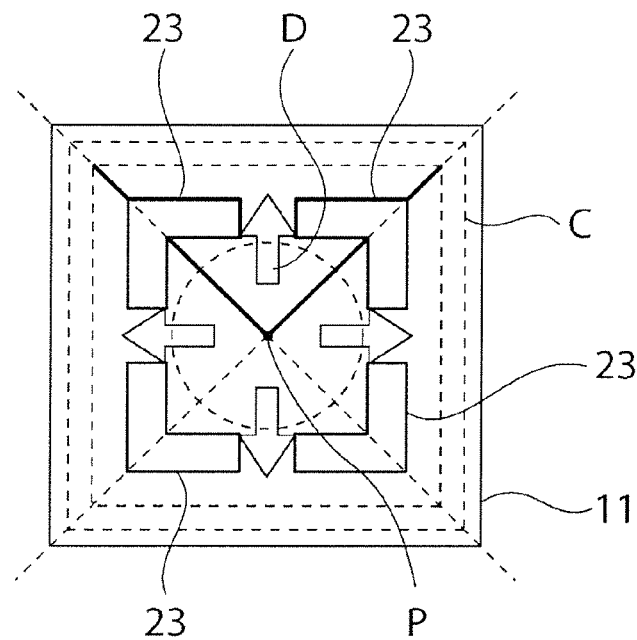
FIG. 6 is a schematic plan view for describing an ultrasonic generator according to a first modification of the first embodiment of the present invention.

FIG. 6 is a schematic plan view for describing an ultrasonic generator according to a first modification of the first embodiment. More specifically, similarly to FIG. 1(c), FIG. 6 schematically shows, in the first acoustic path A, portions of the transverse section of the acoustic path that become relatively smaller. In the modification, each first supporting member 23 has a substantially L shape in plan view. Even in this case, the distance between adjacent first supporting members 23 and 23 becomes smaller towards the front in the travel direction in the first acoustic path A from the ultrasonic generation center point P. Therefore, in the first acoustic path A, portions of the transverse section of the acoustic path that become relatively smaller than other portions thereof are provided. Consequently, as in the first embodiment, it is possible to effectively increase output sound pressure.

Figure 7:
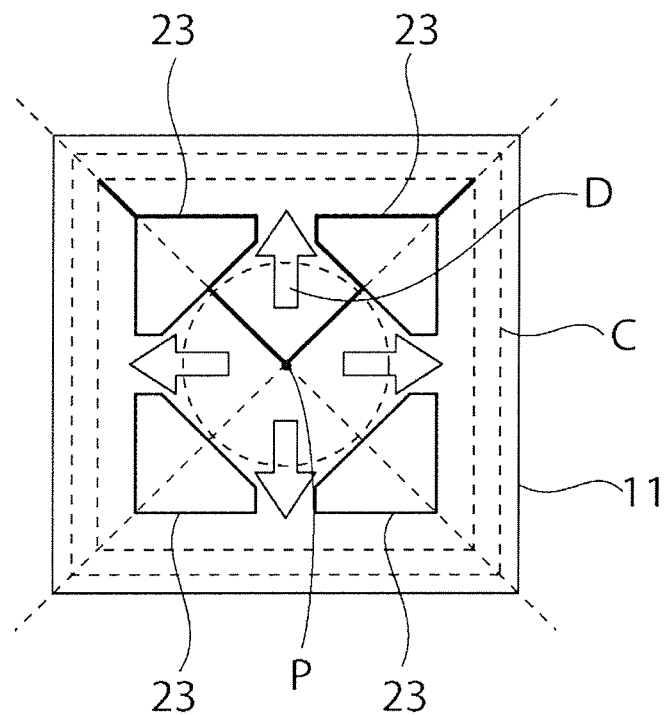
FIG. 7 is a schematic plan view for describing an ultrasonic generator according to a second modification of the first embodiment of the present invention.

FIG. 7 is a schematic plan view for describing an ultrasonic generator according to a second modification of the first embodiment. More specifically, similarly to FIG. 1(c), FIG. 7 schematically shows, in the first acoustic path A, portions of the transverse section of the acoustic path that become relatively smaller. In the modification, each first supporting member is formed by cutting off both ends of the hypotenuse of each first supporting member 23 according to the first embodiment having a right-angled triangular shape in plan view. Even in this case, the distances between adjacent first supporting members 23 and 23 become smaller towards the front in the travel direction in the first acoustic path A from the ultrasonic generation center point P. Therefore, in the first acoustic path A, portions of the transverse section of the acoustic path that become relatively smaller than other portions thereof are provided. Consequently, as in the first embodiment, it is possible to effectively increase output sound pressure.

Figure 8:
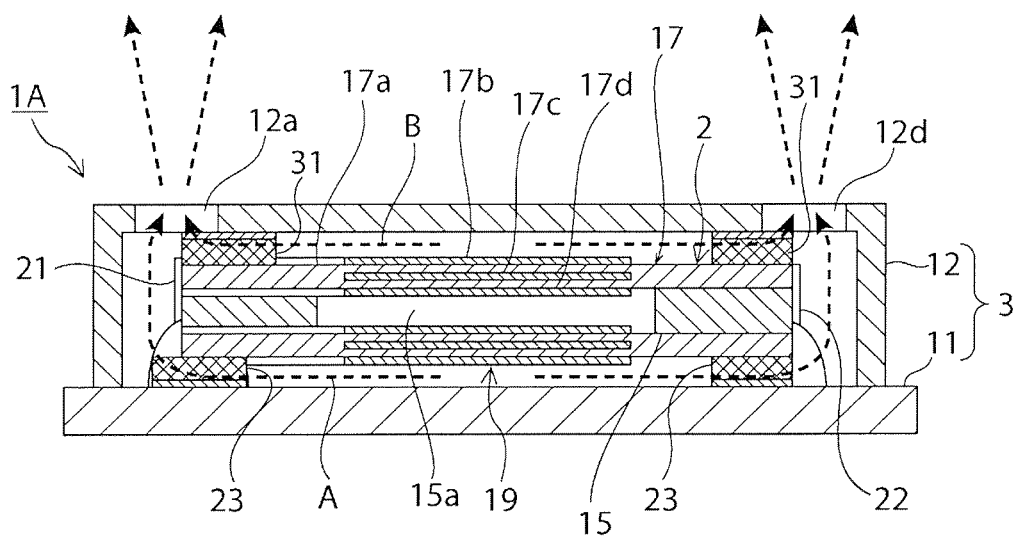
FIG. 8 is a front sectional view of an ultrasonic generator according to a second embodiment of the present invention.
Figure 9:
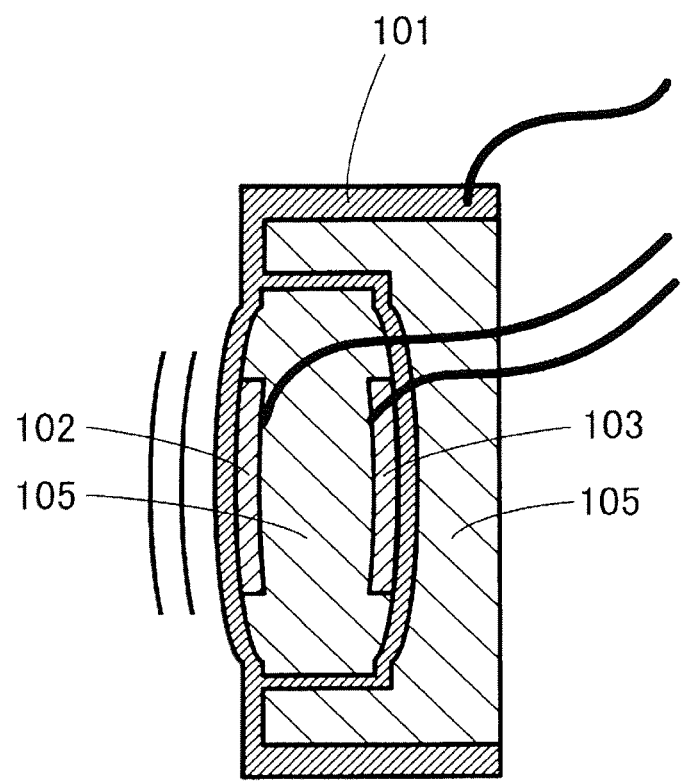
FIG. 9 is a front sectional view of a conventional ultrasonic generator.

FIG. 8 is a front sectional view for describing an ultrasonic generator 1A according to a second embodiment of the present invention. In the first embodiment, the output sound pressure is increased by providing a plurality of first supporting members 23 at the bottom surface of the ultrasonic generating element 2. In the second embodiment, in addition to the structure according to the first embodiment, second supporting members 31 are provided on a top surface of an ultrasonic generating element 2. The second supporting members 31 support the ultrasonic generating element 2 so that a space is formed between the top surface of the ultrasonic generating element 2 and a bottom surface of a second case member 12. Although not shown in FIG. 8, the second supporting members 31 have the same structure as the first supporting members 23 in plan view. Therefore, since the second supporting members 31 are provided, in a second acoustic path B, portions of a transverse section of the acoustic path that become relatively smaller than other portions thereof are provided. Consequently, also in the second acoustic path B, it is possible to effectively increase output sound pressure.

In this way, it is possible to increase output sound pressure by providing a plurality of supporting members in both the first acoustic path A and the second acoustic path B.

Although, in each of the above-described first and second embodiments, the ultrasonic generating element 2 formed from the buckling tuning fork type vibrator is used, in the ultrasonic generator according to the present invention, the structure of an ultrasonic generating element that is supported by a plurality of first supporting members 23 provided on the first case member 11 is not limited to that of the ultrasonic generating element. That is, as long as the ultrasonic generator has a structure extending to the sound-wave emission hole via the first acoustic path, an ultrasonic generating element having a different structure may be used. Even in this case, it is possible to effectively increase output sound pressure as in the embodiments.

REFERENCE SIGNS LIST 1, 1A ultrasonic generator
2 ultrasonic generating element
3 case
11, 12 first case member, second case member
12a to 12d sound-wave emission holes
15 spacer
15a opening
16 adhesive
16a opening
17 first bimorph piezoelectric vibrator
17a piezoelectric plate
17b first excitation electrode
17b1, 17b2 extraction electrode
17c internal excitation electrode
17d second excitation electrode
18 adhesive
18a opening
19 second bimorph piezoelectric vibrator
21, 22 first terminal electrode, second terminal electrode
23, 31 first supporting member, second supporting member

The invention claimed is:
1. An ultrasonic generator comprising:
a first case member;

a second case member coupled to the first case member to define an accommodation space therebetween, the second case member including at least one sound-wave emission hole;

an ultrasonic generating element that generates a sound wave and is disposed in the accommodation space, the ultrasonic generating element including a sound pressure generation center point; and a first supporting member disposed between the first case member and the ultrasonic generating element to define a first space between opposing surfaces of the ultrasonic generating element and the first case member, wherein the sound wave generated by the ultrasonic generating element propagates in a first acoustic path from the sound pressure generation center point to the at least one sound-wave emission hole via the first space, and wherein the first supporting member comprises a shape such that a portion of the first acoustic path narrows as it extends from the sound pressure generation center point and between the opposing surfaces of the ultrasonic generating element and the first case member.

2. The ultrasonic generator according to claim 1, wherein the ultrasonic generating element includes:
a spacer having a through hole in a center thereof,
a first plate-shaped piezoelectric vibrator disposed on a first surface of the spacer, and
a second plate-shaped piezoelectric vibrator disposed on a second surface of the spacer.

3. The ultrasonic generator according to claim 2, wherein the first piezoelectric vibrator and the second piezoelectric vibrator are configured to vibrate in opposite phases.

4. The ultrasonic generator according to claim 1, further comprising a second supporting member disposed between the ultrasonic generating element and the second case member to define a second space between opposing surfaces of the ultrasonic generating element and the second case member.

5. The ultrasonic generator according to claim 4, wherein the second supporting member comprises a shape to define a second acoustic path that extends from the sound pressure generation center point of the ultrasonic generating element to the at least one sound-wave emission hole via the second space.

6. The ultrasonic generator according to claim 5, wherein the shape of the second supporting member narrows a portion of the second acoustic path as it extends from the sound pressure generation center point of the ultrasonic generating element and between the ultrasonic generating element and the second case member.

7. The ultrasonic generator according to claim 1, wherein the first supporting member comprises a plurality of individual supporting members with an adjacent pair of the individual supporting members forming the portion of the first acoustic path that narrows as it extends from the sound pressure generation center point and between the opposing surfaces of the ultrasonic generating element and the first case member.

8. The ultrasonic generator according to claim 7, wherein the adjacent pair of the individual supporting members taper towards one another in a plan view from the sound pressure generation center point of the ultrasonic generating element towards an outer side of the ultrasonic generator.

9. The ultrasonic generator according to claim 8, wherein opposing sides of the adjacent pair of the individual supporting members extend in a direction that crosses an oblique direction with respect to the first acoustic path.

10. The ultrasonic generator according to claim 9, wherein, with respect to the first acoustic path, a side of one of the adjacent pair of individual supporting members is disposed symmetrically with a side of the other of the adjacent pair of individual supporting members.

11. The ultrasonic generator according to claim 10, wherein each of the adjacent pair of the individual supporting member is substantially triangular in plan view, and the opposing sides of the adjacent pair of the individual supporting members are each formed by one side of the corresponding substantially triangular shape.

12. The ultrasonic generator according to claim 7, wherein each of the adjacent pair of the individual supporting members comprise a substantially L shape in a plan view.

13. The ultrasonic generator according to claim 5, wherein the second supporting member comprises a plurality of individual supporting members with an adjacent pair of the individual supporting members forming the portion of the second acoustic path that narrows as it extends from the sound pressure generation center point and between the opposing surfaces of the ultrasonic generating element and the second case member.

14. The ultrasonic generator according to claim 13, wherein the adjacent pair of the individual supporting members taper towards one another in a plan view from the sound pressure generation center point of the ultrasonic generating element towards an outer side of the ultrasonic generator.

15. The ultrasonic generator according to claim 14, wherein opposing sides of the adjacent pair of the individual supporting members extend in a direction that crosses an oblique direction with respect to the second acoustic path.

16. The ultrasonic generator according to claim 15, wherein, with respect to the second acoustic path, a side of one of the adjacent pair of individual supporting members is disposed symmetrically with a side of the other of the adjacent pair of individual supporting members.

17. The ultrasonic generator according to claim 16, wherein each of the adjacent pair of the individual supporting member is substantially triangular in plan view, and the opposing sides of the adjacent pair of the individual supporting members are each formed by one side of the corresponding substantially triangular shape.

18. The ultrasonic generator according to claim 5, wherein each of the adjacent pair of the individual supporting members comprise a substantially L shape in a plan view.

19. The ultrasonic generator according to claim 1, wherein the second case member comprises a plurality of L shaped sound-wave emission holes extending around a perimeter surface of the second case member.

20. The ultrasonic generator according to claim 1, wherein the first supporting member is comprises of at least one of a ceramic, a metal and a resin.

* * * * *